No. 864,778. PATENTED SEPT. 3, 1907.
H. C. GAMAGE.
LUBRICATING DEVICE.
APPLICATION FILED APR. 5, 1907.

3 SHEETS—SHEET 1.

Fig. I.

WITNESSES:
Gustave Dieterich
Edwin K. Dieterich

INVENTOR
Harry C. Gamage
BY Park Benjamin
his ATTORNEY

No. 864,778.

PATENTED SEPT. 3, 1907.

H. C. GAMAGE.
LUBRICATING DEVICE.
APPLICATION FILED APR. 5, 1907.

3 SHEETS—SHEET 2.

WITNESSES:
Gustave Dieterich
Edwin H. Dieterich

INVENTOR
Harry C. Gamage
BY Park Benjamin
his ATTORNEY

No. 864,778. PATENTED SEPT. 3, 1907.
H. C. GAMAGE.
LUBRICATING DEVICE.
APPLICATION FILED APR. 5, 1907.

3 SHEETS—SHEET 3.

WITNESSES:
Gustav Dieterich
Edwin H. Dieterich

INVENTOR
Harry C. Gamage
BY Paul Benjamin
his ATTORNEY

UNITED STATES PATENT OFFICE.

HARRY C. GAMAGE, OF NEW YORK, N. Y., ASSIGNOR, BY MESNE ASSIGNMENTS, TO OIL-BATH LUBRICATOR CO., A CORPORATION OF NEW JERSEY.

LUBRICATING DEVICE.

No. 864,778.          Specification of Letters Patent.          Patented Sept. 3, 1907.

Application filed April 5, 1907. Serial No. 366,474.

*To all whom it may concern:*

Be it known that I, HARRY C. GAMAGE, a citizen of the United States, residing at the city of New York, in the county of New York and State of New York, have invented a certain new and useful Improvement in Lubricating Devices, of which the following is a specification.

The invention relates to a lubricating device for rotary journals and more especially adapted to the continuous lubrication of railway, tram car and other axles.

The invention consists in the novel construction and arrangement herein set forth whereby the lubricant is constantly conveyed to the shaft journal by an endless reticulated traveling belt, wholly disposed on one side of the axis of rotation of said shaft, which belt is supported on elastic flexible rollers preferably formed of wire spirals; said rollers may be, and, as here shown, are, driven from the shaft, and they are supported in a flexible frame, itself resting on springs within the journal box.
The traveling belt is preferably constructed of broad metal plate links connected by wire or filamental links, and is, also preferably, driven at a surface speed less than that of the shaft journal. I also provide a novel construction of transmitting gearing between the shaft and the actuating roller of the lubricant conveying belt, which is so located as, with its inclosing case, to form a screen between the belt and the usual opening in the journal box.

Figure 1:
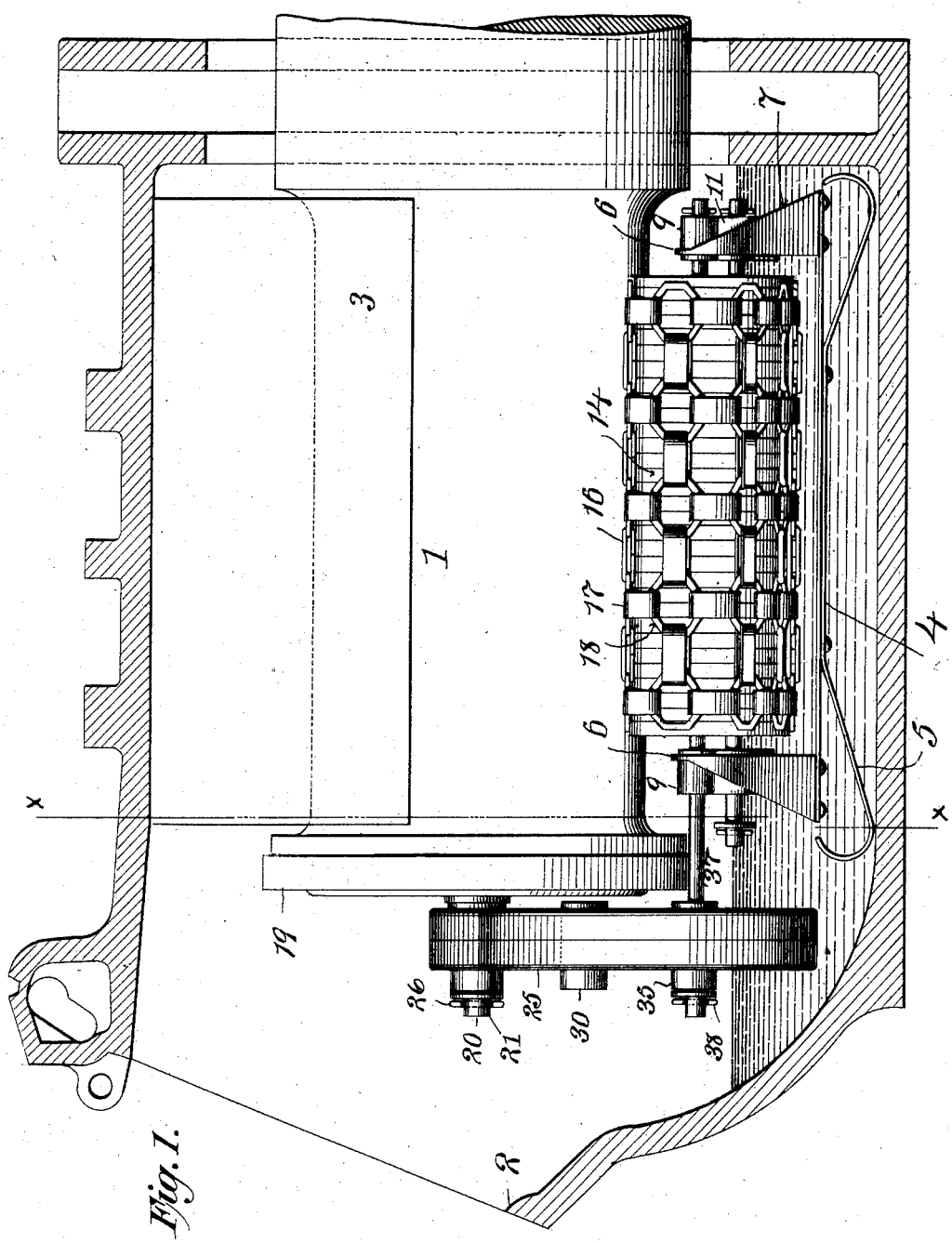
Figure 2:
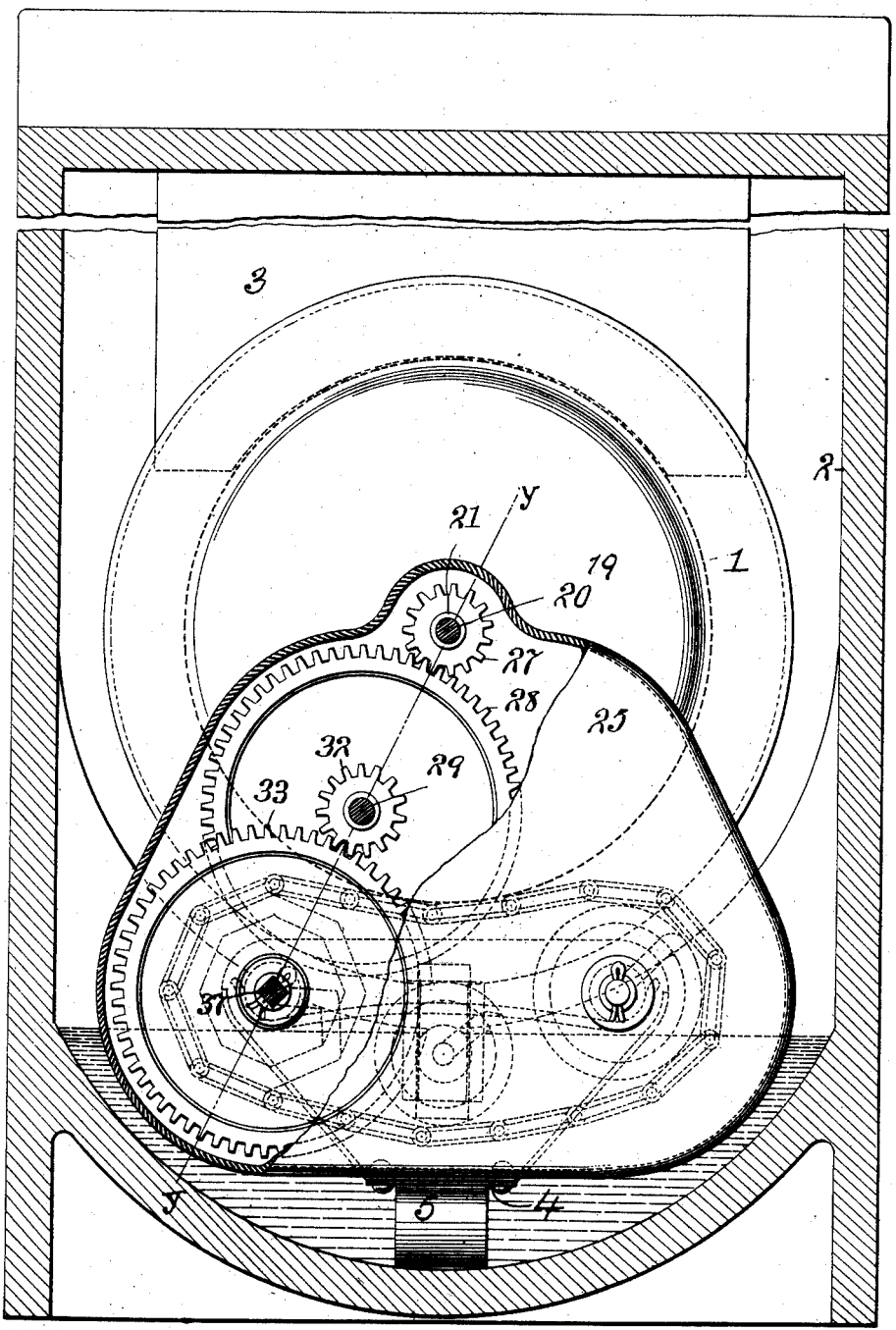
Figure 3:
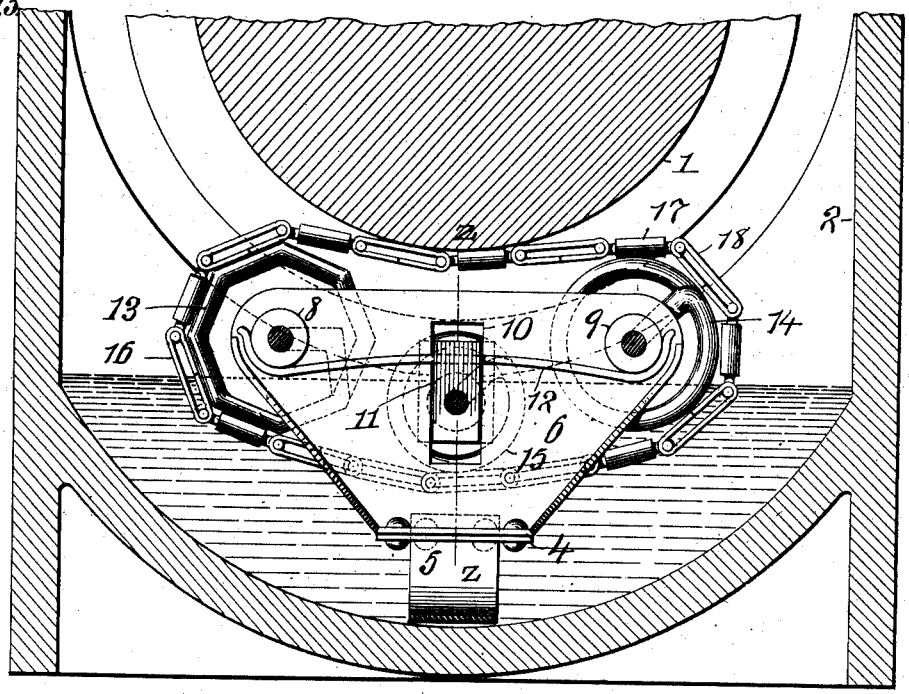
Figure 4:
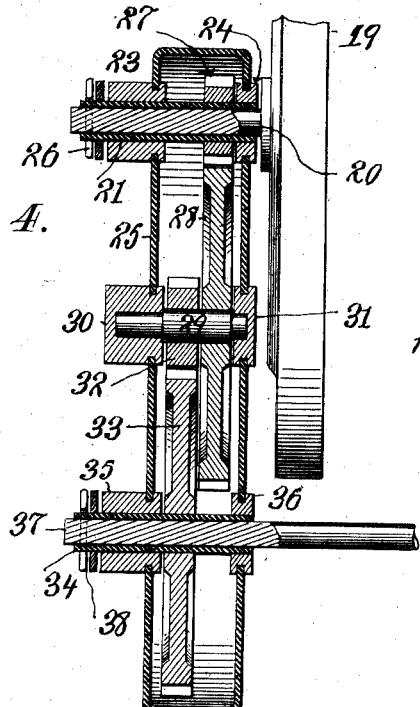
Figure 5:
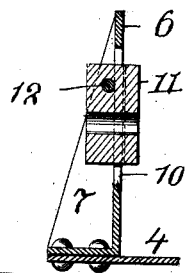

In the accompanying drawings—Figure 1 is a longitudinal vertical section of a car axle box showing my device applied to the axle journal. Fig. 2 is an end elevation with part of the transmitting gear case broken away. Fig. 3 is a partial transverse section on the line *x x* of Fig. 1. Fig. 4 is a section of the gear case and gearing on the line *y. y.* of Fig. 2; and Fig. 5 is a section of the tightener bearing and support on the line *z. z.* of Fig. 3.

Similar numbers of reference indicate like parts.

My device is here shown applied to the journal 1 of a car axle and disposed within the box 2. In said box is the usual bearing 3 above the journal and also the liquid lubricant.

4 is a metal plate supported on leaf springs 5. Said springs 5 rest upon the bottom of the box 2 and their outer ends are curved upward. At each end of the plate 4 is a vertical metal plate 6 flanged at its lower edge and there riveted to the plate 4 as shown in Fig. 5. Said plates are also provided with stay webs 7 in order to stiffen and support them. Each plate 6 has secured in it or made integrally with it the tubular bearings 8 and 9, Fig. 3, and is pierced with a vertical elongated slot 10 in which is a sliding bearing 11, Fig. 5. Through the sliding bearing 11 passes a wire spring 12, the ends of which are upwardly curved and engage under the fixed tubular bearings 8 and 9.

13 is a polygonal roller made of a wire spiral with the turns preferably in contact, and the extremities bent outward to form journals which enter the bearings 8 in plates 6. 14 is a cylindrical roller similarly constructed of wire and journaled in the bearings 9; and 15 is also a cylindrical roller similarly constructed of wire and journaled in the sliding bearings 11 of plates 6. Passing around the rollers 13 and 14 is an endless lubricant-conveying belt 16, formed of broad links 17 of sheet metal united by wire links 18. The construction of this belt may be varied, but the preferable form is shown in Fig. 1, from which it will be seen that (except at the edges of the belt) each wire link 18 is connected to four sheet metal links 17. The width of the belt is to be such as to extend over a large portion, or, if desired, all, of the length of the journal, with the lower part of which journal said belt comes in contact. The roller 15 which is between the two parts of the belt is pressed down upon the lower part of the belt by the spring 12, thus tightening the belt and holding it in contact with the journal, as shown in Fig. 3.

Motion is imparted to the endless belt 16 by the following means. On the end of the shaft or axle is secured in any suitable way, a cap 19, Fig. 4, which carries a fixed central rod 20. Said rod passes through a sleeve 21 which is received in bearings 23, 24 in opposite sides of the gear case 25, and is secured to said sleeve by the cotter pin 26. Within the gear case 25, the sleeve 21 carries the pinion 27 which engages with the pinion 28 carried on a short shaft 29 journaled in bearings 30, 31, in opposite sides of the gear case. On the shaft 29 is a smaller pinion 32, which engages with the pinion 33, fast on sleeve 34, journaled in gear case bearings 35, 36, and receiving a squared extension of the journal of the polygonal roller 13, which extension is secured to said sleeve by cotter pin 38.

The operation of the device is as follows: As the axle rotates motion is transmitted by pinions 27, 28, 32 and 33, to the polygonal roller 13 and so to the endless belt 16, which belt is caused to travel at a surface speed less than that of the periphery of the journal 1. The lower part of the belt being immersed in the liquid lubricant, said lubricant is taken up by the belt in two ways, namely: (*a*) in the form of liquid films in the interstices between the links, and (*b*) adhering to the broad surfaces of the sheet metal links 17. By reason of the contact of the belt with the lower circumferential periphery of the journal the lubricant thus transported is directly and continuously delivered from said belt to said journal, and this delivery is made more effective by the wiping action of the journal over the belt surface due to the difference in surface speeds of journal and belt.

Particular attention is called to the following points: The whole lubricant supplying device is flexible. All of the rollers 13, 14, 15, are flexible because of their spiral wire construction. The bottom plate 4 which supports them is to be of spring metal and is itself supported on the springs 5, while the belt 16 is, of course, flexible. The result is that the belt 16 is held against the journal under conditions of elasticity which insure practically perfect contact irrespective of variations due to wear. The parts are cheaply made and easily assembled, and the device can be inserted and removed after the journal box is permanently fastened in place. The insertion is effected in the following manner. The gear case 25 not being in place, the plate 4 carrying the rollers and belt can be introduced between the axle journal and the bottom of the axle box, all of the parts bending freely in passing through the narrow space bounded by the axle and the curved inner surface of the box, and the springs 5 becoming compressed as the more constricted areas are traversed. As soon as the device comes under the journal the springs 5 expanding lift the belt into contact therewith. The gear case is then put in place by simply introducing the rod 20 and the journal extension 37 into the sleeves 21 and 34 and inserting the securing cotter pins 26 and 38. The gear case then acts as a screen to protect the lubricating device from interference from the outside, or possible injury through the careless introduction of oil can spouts or other objects.

I claim:

1. A rotary shaft, an endless lubricant-conveying belt in contact with said shaft and wholly disposed on one side of the axis of rotation thereof, and mechanism for transmitting motion from said shaft to said belt.

2. A rotary shaft, an endless lubricant-conveying belt in contact with said shaft and wholly disposed on one side of the axis of rotation thereof, and mechanism for transmitting motion from said shaft to said belt, the said mechanism including means for causing said belt to move at a surface speed less than the surface speed of said shaft.

3. A rotary shaft, an endless lubricant conveying traveling belt in contact therewith, and flexible rollers supporting said belt.

4. A rotary shaft, an endless lubricant-conveying belt in contact therewith, and flexible rollers each formed from a spiral of wire supporting said belt.

5. A rotary shaft, an endless lubricant-conveying traveling belt in contact therewith, rollers carrying said belt and a support in which said rollers are journaled, the said support being longitudinally flexible.

6. A rotary shaft, an endless lubricant-conveying traveling belt in contact therewith, longitudinally flexible rollers carrying said belt and a longitudinally flexible support in which said rollers are journaled.

7. A rotary shaft, a casing therefor, an endless lubricant-conveying traveling belt in said casing and in contact with said shaft, longitudinally flexible rollers carrying said belt, a longitudinally flexible support in which said rollers are journaled and springs beneath said support.

8. A rotary shaft, an endless lubricant-conveying belt in contact therewith, rollers supporting said belt, motion transmitting mechanism between said shaft and one of said supporting rollers, and means for detachably connecting said mechanism to said shaft and said roller.

9. A rotary shaft, an endless lubricant-conveying traveling belt in contact therewith, rollers supporting said belt, motion transmitting gearing, an inclosing case therefor and means for detachably connecting said case and said gearing to said shaft and said roller.

10. A rotary shaft, an endless lubricant-conveying traveling belt in contact therewith, rollers supporting said belt, one of said rollers being polygonal, and motion transmitting mechanism between said shaft and said polygonal roller.

11. A rotary shaft journal, a casing therefor, having an opening, a traveling lubricant-conveying band in said casing in contact with and below said journal, and mechanism for actuating said band from said shaft disposed in said casing and between said opening and said band.

12. A rotary shaft journal, a casing therefor having an end opening, a mechanism for conveying lubricant to said journal disposed in said casing and below said journal, and a detachable screen disposed in said casing and between said opening and said lubricant-conveying mechanism and having an area sufficient to shield said lubricant conveying mechanism from access through said opening.

13. In a lubricating device, a base plate, side plates supported on said base plate, rollers journaled in said side plates and a traveling lubricant conveying belt carried by said rollers.

14. In a lubricating device, a base plate, side plates supported on said base plate, rollers journaled in said side plates, a traveling lubricant conveying belt carried by said rollers and means between said rollers for tightening said belt.

15. In a lubricating device, a base plate, side plates supported on said base plate, rollers journaled in said side plates, an intermediate roller between said rollers, vertically sliding bearings in said side plates receiving the journals of said intermediate roller, a traveling lubricant-conveying belt on said rollers and a spring acting upon said sliding bearings to cause said intermediate roller to tighten said traveling belt.

16. A rotary shaft, an endless lubricant-conveying traveling belt, and supports for said belt; a portion of said belt between said supports being in contact with said shaft.

17. A rotary shaft, an endless lubricant-conveying traveling belt and elastic supports for said belt; a portion of said belt between said supports being in contact with said shaft.

18. A rotary shaft, a traveling lubricant-conveying band in contact with said shaft and wholly disposed on one side of the axis of rotation thereof, and means for driving said shaft and band at different surface speeds.

In testimony whereof I have affixed my signature in presence of two witnesses.

HARRY C. GAMAGE.

Witnesses:
WM. H. SIEGMAN,
GERTRUDE T. PORTER.